United States Patent [19]

White et al.

[11] 4,393,082

[45] Jul. 12, 1983

[54] ION EXCHANGE MATERIALS TO INCREASE CONSUMPTION OF NON-PROTEIN NITROGEN BY RUMINANTS

[75] Inventors: Joe L. White, Lafayette; Alvin J. Ohlrogge, West Lafayette, both of Ind.

[73] Assignee: Purdue Research Foundation, West Lafayette, Ind.

[21] Appl. No.: 812,797

[22] Filed: Jul. 5, 1977

Related U.S. Application Data

[63] Continuation-in-part of Ser. No. 715,973, Aug. 19, 1976, abandoned, which is a continuation-in-part of Ser. No. 89,579, Nov. 16, 1970, abandoned.

[51] Int. Cl.$^3$ .................................................. A23K 1/22
[52] U.S. Cl. .......................................... 426/2; 426/69; 426/74
[58] Field of Search ........................ 426/2, 69, 74, 807

[56] References Cited

U.S. PATENT DOCUMENTS

| | | | |
|---|---|---|---|
| 2,768,895 | 10/1956 | Kamlet | 426/69 |
| 2,828,207 | 3/1958 | Fullhart | 426/69 |
| 2,965,488 | 12/1960 | Belasco | 426/69 |
| 3,180,735 | 4/1965 | Titus | 426/74 |
| 3,541,204 | 11/1970 | Sibbald | 424/38 |
| 3,600,188 | 8/1971 | Wilding | 71/30 |
| 3,669,878 | 6/1972 | Marantz | 210/22 |

FOREIGN PATENT DOCUMENTS 1209399 10/1970 United Kingdom .................. 426/69

OTHER PUBLICATIONS

Condensed Chemical Dictionary, 8th Ed., Hawley Van Nostrand, N.Y., p. 493.
Feeds and Feeding, Morrison 22nd Ed., Morrison, Pub. 10, 1957, Ithaca, N.Y.

Primary Examiner—Hiram H. Bernstein
Attorney, Agent, or Firm—Leydig, Voit, Osann, Mayer & Holt, Ltd.

[57] ABSTRACT

In the feeding of non-protein nitrogen (NPN) compounds such as urea to ruminants, the NPN compound is decomposed to ammonia in the rumen. To mitigate against toxic effects of the resulting high ammonium ion content of the ruminal fluid, a zeolite, or crystalline alumino silicate cation exchange material, is introduced into the rumen and maintained therein so that ammonium ions formed by NPN decomposition are accumulated during the post-feeding fermentation period, and later released by the regenerant action of saliva entering the rumen during rumination.

19 Claims, 2 Drawing Figures

NH4+ ADSORPTION ON SODIUM ZEOLITE AFTER PLACEMENT OF 5g. UREA IN RUMEN OF SHEEP

ION EXCHANGE MATERIALS TO INCREASE CONSUMPTION OF NON-PROTEIN NITROGEN BY RUMINANTS

This is a continuation-in-part of Ser. No. 715,973, filed Aug. 19, 1976, which is a continuation in-part of Ser. No. 89,579 filed Nov. 16, 1970 both now abandoned.

BACKGROUND OF THE INVENTION

This invention relates to the feeding of non-protein nitrogen (NPN) compounds, such as urea and the like, to ruminants. More particularly, it concerns improvements which permit the use of larger amounts of NPN compounds without encountering toxicity and related difficulties.

All animals require protein. Simple-stomached animals such as swine and poultry require preformed protein, for vegetable or animal sources, in their diets, but ruminant animals are uniquely different. Microorganisms found in the rumens (paunch, or first stomach) of cattle, sheep, goats, and other ruminants allow the animal to manufacture protein amino acid from simple nitrogen compounds. Apparently, non-protein nitrogen (NPN) compounds such as urea or biuret are first converted to ammonia through the action of urease or bi-urease enzyme produced by the rumen microorganisms, which then utilize the ammonia to synthesize protein amino acids which can be digested by the ruminants digestive system.

This ability of ruminants to utilize NPN compounds as indirect protein sources has important economic consequences for the farmer. By substituting NPN compounds for a portion of the natural protein, major economies are realized. See the book "Urea as a Protein Supplement" by M. M. Briggs (Pergamon, 1967).

One pound of urea is equivalent in nitrogen content to over five pounds of a high protein feed such as soy bean oil meal. On the basis of relative cost per unit of nitrogen, in 1970 soy bean oil meal cost over seven times as much as urea; in early 1973, the relative cost ratio increased to over twelve to one. As a consequence, there is a strong incentive to replace a portion, or even all, of the vegetable protein fed to ruminants with NPN compounds.

Unfortunately the amount of NPN compound that a ruminant can ingest is quite limited. The ammonia, or its equivalent ammonium ion, produced during post-feeding fermentation when the NPN compound is decomposed can be transferred to the blood stream across the rumen wall. When high levels of blood ammonia occur, the acid-base balance of the blood changes, and the central nervous system is affected. Early toxic symptoms are bloat, incoordination, labored breathing, and excessive salivation; in extreme cases there may be convulsions and death.

Various attempts have been made to limit the ammonia concentration in the rumen so as to permit the use of more NPN compound in the daily ration. Antiurease compounds, somewhat more stable urea derivatives, coated urea particles, replacement of urea with biuret, and homogeneous admixture of the NPN compound with all of the feed, have been proposed. All have had qualified success.

SUMMARY OF THE INVENTION

Briefly, in accordance with the invention, ruminants which are fed a non-protein nitrogen compound as part or all of their nitrogen intake are provided with at least one foraminous bolus containing a zeolite, i.e., a crystalline alumino silicate having exchangeable cations. The bolus is introduced into the rumen so that ammonia, or ammonium ions, formed by the decomposition of NPN compound during post-feeding fermentation is partially exchanged onto the zeolite to substantially reduce the ammonim ion content of the ruminal fluid so that it is below a toxic level. Thereafter, as the animal ruminates, saliva enters the rumen and gradually releases the ammonia from the zeolite into the ruminal fluid by the regenerant action of cations in the saliva fluid.

This invention is accordingly based in part on the discovery that the digestive system of ruminants constitutes an ideal regenerative cation exchange medium for the ammonia intermediate of NPN digestion. When a cation exchange zeolite is present, ammonia that forms in high concentration during NPN digestion is partially taken up by the zeolite. Later, during rumination, the input of saliva into the rumen gradually regenerates the zeolite to liberate the ammonia.

Thus, the ruminants fed with NPN compound and having a zeolite in their rumens are protected against the toxic effects of high ammonium ion content which would otherwise exist shortly after ingesting the NPN compound. In keeping with the invention, such animals may be maintained on a higher NPN compound level than they could safely tolerate in the absence of zeolite, with consequent advantages in terms of economics and animal safety.

Additionally, the advantages reported by some investigators (Virtanen, A. I., Science, 153, 1603 (Sept. 30, 1966), to the effect that high urea concentration in the feed permits extraordinary large milk production in lactating cows, may now be availed of without undue risk to the health of the animal. Further, not only does the more facile accomodation of high NPN compound rations afford direct economic benefits in reducing the cost of feedlot steers and sheep and goats, but the ability to use higher levels of low-cost protein supplementation in range, growing, and winter feeding is particularly beneficial.

Thus, in summary, maintaining a cation-exchange zeolite in the rumen of an animal being fed non-protein nitrogen compound as a protein source, allows the zeolite to act as an accumulator for excess ammonia generated in the rumen during the post-feeding fermentation period (when the NPN compound is being decomposed to ammonia) and to gradually release the ammonia into the ruminal fluid for later utilization by the rumen microorganisms. The release is effected by the regenerant action of a saliva, when, during rumination, portions of the rumen fluid are returned to the mouth for mastication and reinsalivation. The take-up of ammonia by the cation exchange zeolite during the post-feeding fermentation permits the addition of supplemental NPN compound to the animal feed while protecting the animal against the production to toxic levels of ammonia.

BRIEF DESCRIPTION OF DRAWINGS

Various objects and advantages of the invention will become apparent from the following detailed description, and upon reference to the drawings, in which.

Figure 1:
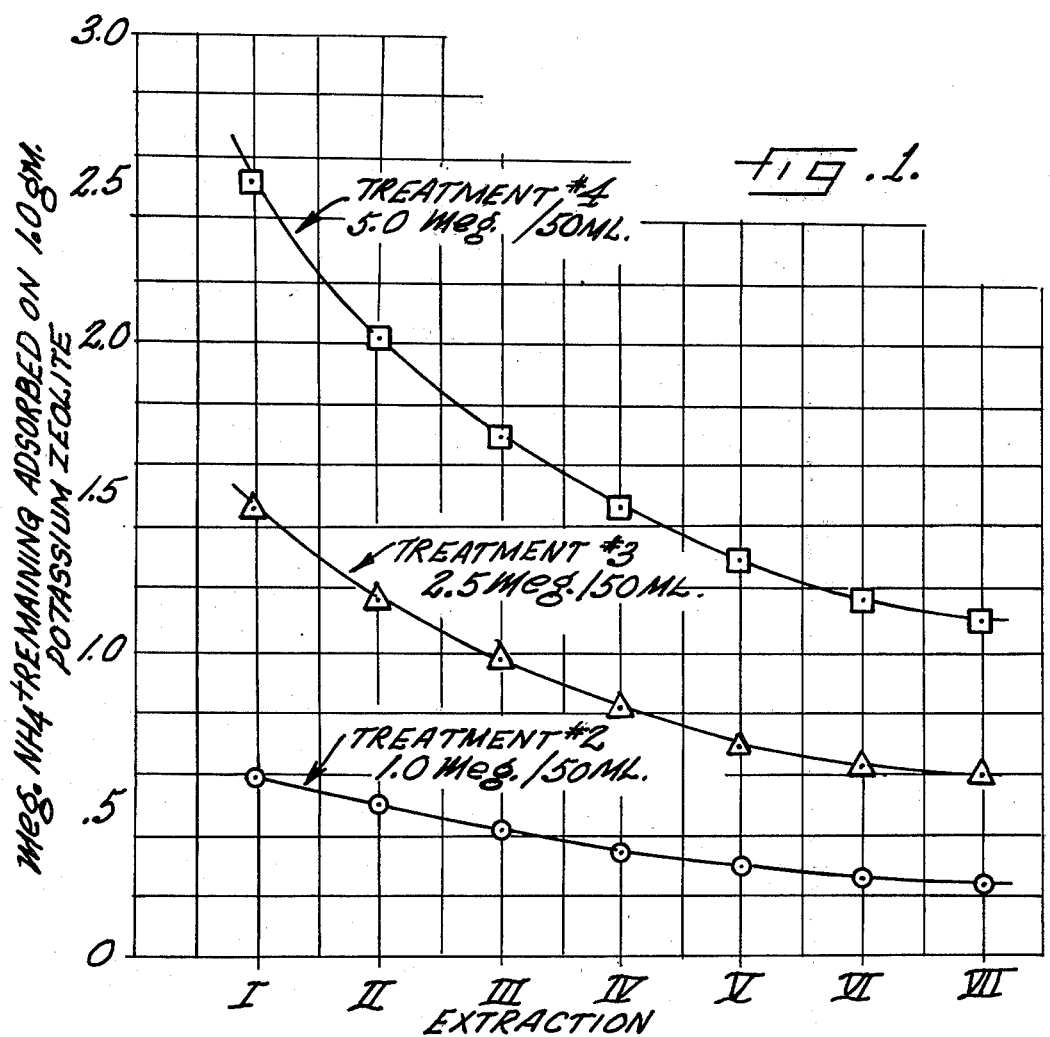
FIG. 1 depicts the effect of successive treatments and extractions (regenerations) on a potassium zeolite F, as reflected in Table IX.

While the invention will be described in connection with preferred procedures, it will be understood that it is not intended to limit the invention to those procedures. On the contrary, it is intended to cover all alternatives, modifications, and equivalents as may be included within the spirit and scope of the invention as defined by the appended claims.

DETAILED DESCRIPTION

Cation Exchange Zeolites

The cation exchange material useful in accordance with the invention are any of the cation exchange materials capable of reversibly taking up and releasing ammonia in the form of ammonium ions. These have an insoluble, immobile anion structure and replaceable cations (see "Ion Exchange", in Kirk-Othmer's "Encyclopedia of Chemical Technology", Vol. 11, pp. 871-899, Second Ed.). Included within this group of cation exchange materials are the natural and the synthetic zeolites, the non-crystalline and the crystalline zeolites, and the expanding clay minerals of the smectite group such a montmorillonite and vermiculite. As will appear, certain of these materials have unusually advantageous properties.

Organic cation exchange resins, particularly the sulfonic acid organic high polymers such as sulfonated polystyrene are quite satisfactory, and generally combine useful cation capacity per unit weight or volume with adequate selectivity for the ammonium cation. Similarly, synthetic amorphous "zeolites", or permutites, which are aluminosilicates having exchangeable cations, are likewise satisfactory.

The crystalline aluminosilicates, both natural and synthetic, appear to be somewhat superior to the organic cation exchange materials from the standpoints of exchange capacity, selectivity, and inertness in the ruminal environment. For example, natural zeolites such as chabazite and clinoptilolite are shown below to be excellent in this regard, and are reasonably available in commercial quantities and purities. Other natural or mineral zeolites include gmelinite, leucite, ptilolite, mordenite, et cetera.

The synthetic crystalline aluminosilicates however posess the additional advantages of being readily available in high purities and with a variety of exchangeable cations. For example, the synthetic zeolites having the framework structures of zeolite X (U.S. Pat. Nos. 2,882,244), Y(3,130,007), F(2,996,358), J(3,011,869), M(2,995,423), Q(2,991,151), Z (2,972,516), and H (3,010,789) are extremely effective. The potassium-derived zeolites having a silica-to-alumina ratio of about 2.0 ($\pm$0.3), e.g., F, H, J, M, Q, and Z, are outstanding. Not only do they have an extremely high capacity for the ammonium ion and, apparently, a selectivity for the ammonium ion at least equal to their affinities for sodium, potassium, and calcium, but it appears that ammonium ion take-up exceeds that which can be accounted for by simple ion exchange. Otherwise stated, the data indicate that some of the ammonium ion is taken up by a mechanism other than simple cation exchange; perhaps the "molecular sieve" nature of the crystalline aluminosilicate has an effect on the ammonium ion adsorption.

Of the zeolites tested in the experimental section below, zeolite F is by far and away the most outstanding. Its capacity for ammonium ion is approximately twice that of any other synthetic crystalline aluminosilicate tested, and several times that of the natural or mineral crystalline zeolites.

The zeolites may be used in any convenient cationic form, provided only that the cation is biologically acceptable to the ruminant. Advantageously, sodium, potassium, hydrogen, or ammonium cation forms may be employed, with the proviso that ammonium cationic zeolites are best avoided if urea feeding is to be commenced shortly after zeolite introduction. In any event, any of the zeolites having the structures above may be used, either per se as powders, or as pellets, in the latter case desirably mixing with appropriate binders, e.g., clays or the like, and compaction into the desired shapes.

Introduction of Zeolite into Rumen

Consistent with the invention, the zeolite is introduced into the ruminal cavity prior to decomposition of the non-protein nitrogen compound, that is, before the NPN compound is decomposed by the microbial flora in the rumen to form ammonia, and thereafter converted to protein amino acids.

In the preferred practice of the invention, the zeolite is formed into small porous beads or pellets, typically 1/16" diameter, and placed within a foraminous bolous or canister. One or more boli are then orally administered, by a balling gun or the like, into the stomach of the animal. Alternatively, the boli may be admixed in the ration for intake by the animal at feeding time.

In either event, the bolus or boli tends to remain in the ruminal cavity during the life of the animal. Extended retention of the boli is facilitated by using a bolus having a specific gravity higher than that of the ruminal fluids, for example a gravity in the range of 1.2 to 2.5, and by ejecting the bolus into their ventral sac of the rumen, where its further progress through the digestive system tends to be obstructed by the rumino-rectricular fold separating the rumen and the reticulum.

The amount of zeolite introduced into the animal depends on the nature (capacity and selectivity) of the zeolite, the size of the animal, and on the desired and expected maximum levels of ammonium ion concentration. For example, when a zeolite X or Y molecular sieve is employed with cattle, the approximately 50 liter rumen requires about 500 grams of molecular sieve to store an estimated ammonium ion concentration of 10 meq/liter. An individual bolus 3 centimeters by 7 cm (50 cc or approximately 60 g) is used, requiring about 10 boli for the desired sieve inventory.

For sheep, it has been found that about 2.5–5.0 grams of zeolite X per 100 ml of rumen fluid, corresponding to about 150–300 grams per animal, is adequate. Boli of about 1.5 cm in diameter by about 2 cm long may be used.

By way of guidance, the quantity of zeolite needed to substantially reduce the ammonium ion content of the ruminal fluid will usually be in the range of about 0.1–10 grams per kilogram of body weight. The optimum level will depend on the type of zeolite, the size of the zeolite particles, the accessability of the particles, the porosity of the bolus, and the expected quantity of NPN compound. This can be determined experimentally for a predetermined set of conditions by trial and error; commencing with, for example, one gram per kilogram, the NPN ingestion rate can be increased until adverse symptoms are noted, at which time the rate should be decreased or the zeolite inventory increased.

It has been shown, in the data given below, that the degree of dispersion of the zeolite is of major importance, and that powder or granular form zeolites take up and release ammonium ion substantially more rapidly than pellet form particles. However, powder or granular form zerolite, unless suitably confined, are eliminated too rapidly through the digestive system; even pellets of 1/16 or ⅛ inch in diameter are retained to the extent of less than about 5% during a single week. Accordingly, it is necessary that the zeolite be confined in a suitable bolus or canister, or a plurality of such boli or canisters.

As indicated previously, an important feature of the invention is the maintaining of zeolite-containing boli in the rumen during a large number of digestive cycles, and advantageously during the entire lifetime of the animal. To this end, the bolus or boli is made of sufficient size, weight, and/or shape as not to be removable from the animal in the normal course of events.

By way of example, the bolus may be sufficiently large so that once inserted it cannot readily pass into the reticulum. Alternatively, and indeed advantageously, the bolus or boli may be weighted so that it sinks to the bottom of the rumen, or attached by one or more inert cables to a weighted anchor. A plurality of boli, connected by one or more cables to one or more anchors so that the boli are essentially distributed throughout the rumen to facilitate mass transfer, appear to be ideal.

Capsule-shaped boli, which are essentially cylindrical but with hemispherical ends, are particularly easy to insert. Conventional stomach tubes for pumping the stomachs of cows have an inner diameter of about 1⅝ inches, and accordingly boli for cows weighing over about 1100 pounds are desirably about 1⅜" diameter by 6 to 10" long.

The bolus material may be any substance that can be perforated to provide the desired contact between the rumen fluid and the zeolite particles, and may either be a relatively heavy metal, e.g. stainless steel, or a foraminous plastic (e.g., nylon) bag, suitably weighted or attached to an anchor.

In particular circumstances, a group of boli may be joined together, either directly or via connecting cords, to provide a "chain" of boli. Alternatively, a single hot-dog shaped bolus, of a length perhaps 10 to 50 times its diameter, may be utilized.

As noted earlier, one of the variables in determining the necessary amount of zeolite is the identity of the animal. It has been reported (Ioset, R. M., "Down to Earth", 25, No. 2 (1969), Dow Chemical Co.) that, in the absence of zeolite treatment in accordance with the present invention, urea-adapted lambs can ingest 40 grams of urea a day without incresing blood ammonia levels. Similarly, an adapted sheep can take in 86.9 grams of urea per 100 pounds of body weight. With respect to cattle, lactating dairy cows after adaptation can safely utilize as much as 650 grams of urea per day; feedlot steers apparently had no need for such a high urea level. Equivalent amounts of biuret or of ammonium salts may be used.

When zeolites are incorporated into the rumen, the urea levels may be increased substantially. It has been the practice in the past to restrict NPN intake to no more than about one-third of the total nitrogen, but this may be exceeded provided sufficient zeolite is present to imbibe the excess ammonium ion.

Salivation

As noted earlier, the function of a cation exchange zeolite in the rumen is to act as an accumulator for the ammonia, or ammonium ion, generated in the rumen when the NPN compound is decomposed, and to thereafter gradually release the ammonia under the influence of saliva.

After having eaten, portions of the ruminant and reticular cavity contents are returned to the mouth for mastication and reinsalivation. Saliva produced during his rumination contains substantial amounts of sodium, which disturbs the sodium-ammonium equilibrium between the zeolite and ruminal fluids, thereby displacing some of the ammonium ion from the zeolite.

It has been estimated that a mature cow will secrete 56 liters, or more, of saliva in twenty-four hours, of which 40 liters is evolved during eating and rumination and 16 liters during rest. This saliva may contain sodium ions equivalent to 300 grams of sodium carbonate, or 13,000 meq of sodium ion.

Various techniques are known for increasing the quantity of saliva produced. For example, artificial roughage in the form of polyolefin pellets, e.g., polethylene pellets (Virtanen) or other low-density plastic shapes (e.g., Collier U.S. Pat. No. 3,415,225), promote the secretion of saliva and therefore facilitate regeneration of the zeolite when used in combination with such saliva-inducing devices.

ILLUSTRATIVE EMBODIMENTS

In the following illustrative embodiments, experiments are described which demonstrate the ability of the inventive system to mitigate the toxic effects of high ammonium content of the ruminal fluid, and to gradually release the ammonium ion by the regenerant action of saliva entering the rumen. Studies are made both in vitro and in vivo, and involving both permanent and temporary ion exchange systems.

In each instance, zeolite is introduced into the rumen, or simulated rumen, under conditions corresponding to the composition of an NPN compound shortly after feeding, and thereafter corresponding to regeneration by the influx of saliva entering the rumen.

The results are presented below in the form of several experimental series.

SERIES A

This series of experiments is conducted to determine the effectiveness of several natural and synthetic crystalline alumino silicates in the process of the invention. To obtain accurate quantitative data, the experiments are conducted in vitro, utilizing synthetic saliva and synthetic rumen fluid, each corresponding in cation composition to typical bovine saliva and rumen fluids (Bailey, C. B., *Brit. Jour. Nutrition*, 15, 489–498, 1961; Lampila, M., *Annales Agri. Fenniae, Seria Animalia Domestica*, 3, No. 5, 1965; Lampila, M., *J. Sici. Agri. Soc. Finland*, 32, 169–175, 1960).

The artificial saliva has the following composition:
140 meq sodium chloride per liter
15 meq potassium chloride per liter
5 meq calcium chloride per liter The artificial ruminal fluid has the following composition:
85 meq sodium chloride per liter
50 meq potassium chloride per liter
5 meq calcium chloride per liter Nine natural or synthetic crystalline alumino silicates (zeolites) are employed. These have the composition shown in Table I, below. The potassium forms of zeolite X and zeolite Y are prepared by stirring the respwective sodium forms for thirty minutes each with two portions of 30% potassium chloride solutions, following which the zeolites are washed thoroughly with water to remove salts, dried at 110° C., and air-equilibrated before use.

TABLE I

Chemical Analyses of Zeolites Used for Mixed Ion Exchange Experiments

| Zeolite | $Na_2O$ | $Al_2O_3$ | $SiO_2$ | LOI* | CaO | MgO | $K_2O$ |
|---|---|---|---|---|---|---|---|
| 1. Sodium Zeolite A (U.S. Pat. No. 2,882,243) 1/16" binderless pellets | 15.1% | 28.0% | 35.8% | 20.1% | — | — | — |
| 2. Natural Chabazite 1/16" pellets | 3.0 | 13.5 | 57.1 | 15.5 | 3.2% | 1.3% | 1.4% |
| 3. Natural Clinoptilolite - A (Hector, Calif.) powder | 4.9 | 11.7 | 66.9 | 13.5 | 0.6 | 1.0 | 0.6 |
| 4. Natural Clinoptilolite - B (low purity) powder | 1.4 | 13.2 | 61.9 | 15.7 | 2.4 | 1.5 | 1.8 |
| 5. Potassium Zeolite F (U.S. Pat. No. 2,996,358) powder | 0.17 | 28.1 | 34.0 | 14.1 | — | — | 22.1 |
| 6. Sodium Zeolite Y (U.S. Pat. No. 3,130,007) powder | 12.6 | 20.4 | 41.7 | 25.0 | — | — | — |
| 7. Potassium Zeolite Y (U.S. Pat. No. 3,130,007) powder | 0.15 | 19.8 | 40.4 | 21.3 | — | — | 17.4 |
| 8. Sodium Zeolite X (U.S. Pat. No. 2,882,244) 1/16" pellets, 25% binder | 12.1 | 22.0 | 38.8 | 23.2 | — | — | — |
| 9. Potassium Zeolite X (U.S. Pat. No. 2,882,244) powder | 0.21 | 23.0 | 34.5 | 22.8 | — | — | 18.9 |

*Loss on ignition, i.e., zeolite water

Pellet-form zeolites are tied in a cheesecloth bag and suspended in the exchange solutions for two hours, unless otherwise noted. Powder-form zeolites are not enclosed in a container, but rather are treated in the form of slurries or suspensions. In order to avoid loss of zeolite during exchange treatments of powder-form zeolites, the slurry is centrifuged until clear, the supernate drained off for analysis, and the small amount of solids remaining rinsed back into the bulk of the suspension using makeup solution prepared for the next exchange. Unless otherwise stated, the exchange time is thirty minutes for powder-form zeolites.

Ammonium determinations are performed by treating 10 ml aliquots (in some instances 25 ml aliquots) of solution or 200 milligrams of zeolite in a Kdjeldahl distillation still with 50% potassium hydroxide solution, steam distilling the ammonia into 10 ml of saturated boric acid solution, and titrating the 100 ml of steam distillate containing ammonia with 0.025 N hydrochloric acid to the methyl purple endpoint.

Initially, to determine the rate of ion exchange as a function of zeolite form, 10 grams of 1/16" pellets (sodium zeolite X) and 10 grams of powder (ammonium zeolite F) are separately stirred with solutions containing exchangeable cations. Periodically samples are withdrawn. The results demonstrate the strong dependence of ion exchange rate on the physical form of the zeolite. Thus, as shown in Table II below, pellet-form zeolite under the conditions of the test requires 3.0 hours to reach 90% of equilibrium exchange and approximately 60 hours to reach 100% of equilibrium, whereas powder-form zeolite reaches equilibrium (Table IIa) within 0.5 hours.

TABLE II

Ion Exchange Rate of 10 g Sodium Zeolite X (1/16" Pellets) Stirred With 500 ml of Solution Containing 60 meq $NH_4$ Per Liter

| Time (hours) | Meq $NH_4$/gm. | % of equilibrium value |
|---|---|---|
| 0.5 | 0.86 | 52 |
| 1.0 | 1.11 | 67 |
| 2.0 | 1.40 | 84 |
| 3.0 | 1.50 | 90 |
| 4.0 | 1.55 | 93 |
| 60.0 | 1.66 | 100+ |

TABLE IIa

Ion Exchange Rate of 10 g $NH_4$ Zeolite F (Powder) Stirred With 500 ml of Solution Containing 140 meq Na, 15 meq K and 5 meq Ca Per Liter

| Time (hours) | Meq $NH_4$/gm. | % of equilibrium value |
|---|---|---|
| 0.5 | 0.81 | 100 |
| 1.0 | 0.81 | 100 |
| 2.0 | 0.81 | 100+ |

+Equilibrium assumed

Also as a preliminary to the tests in this Series A, pellets of sodium zeolite X were permitted to stand overnight in two solutions containing ammonium, potassium, and sodium ions, with one of the solutions additionally containing calcium. At the conclusion of the experiment, ammonium ion retention on the two zeolites were measured, with the results of Table III below:

TABLE III

Overnight Equilibration of 10 g Sodium Zeolite X (1/16" Pellets) With 500 ml of a Solution Containing:
A 60 meq $NH_4$, 50 meq K, 85 meq Na per liter
B 60 meq $NH_4$, 50 meq K, 85 meq Na, 5 meq Ca per liter

| | $NH_4$ on zeolite, meq per gram |
|---|---|
| A (no Ca) | 0.77 |
| B (Ca) | 0.73 |

In the experiments summarized in Tables IV, V, and VI, below, the indicated zeolites are placed in an artificial rumen solution, and ammonium chloride added stepwise to the indicated concentration. After equilibration, the ammonium ion content of the zeolite is determined, corresponding to the ability of the particular zeolite to adsorb ammonium ion drying periods of high concentration in the rumen.

For this portion of the experiment, 10 grams (unless otherwise indicated) of the zeolite is pre-conditioned by treating three times with 500 ml of the previously described artificial saliva, and the zeolite then washed with water to remove salts. Thereafter, the conditioned zeolite is treated in a stepwise manner with 500 ml of the previously described artificial saliva, and the zeolite then washed with water to remove salts. Thereafter, the conditioned zeolite is treated in a stepwise manner with 500 ml of a solution having the composition of artificial rumen fluid, stated above, together with stepwise incrementally increased concentrations of ammonium chloride (10 meq to 60 meq per liter).

Stepwise treatment is effected by stirring 10 grams of conditioned zeolite with 500 ml of artificial rumen containing 10 meq $NH_4$ per liter; a 500 ml portion of the same solution is subjected to the same treatment described below, but without any zeolite, and serves as a control. Then, 100 ml aliquots of each solution are removed for analysis and replaced by 100 ml of artificial rumen solution plus sufficient $NH_4Cl$ to increase the $NH_4$ concentration to the next concentration desired. This is repeated until the maximum desired concentration of about 60 meq $NH_4$ per liter is attained. The final zeolite is then removed from the solution, washed with water, dried at 110° C., and air-equilibrated before proceeding. In some instances a small portion of the dried zeolite is analyzed for ammonium.

The ammonium exchanged zeolite, above, is then back-exchanged or regenerated by stirring with 500 ml of artificial saliva. Small portions of the solution are removed at time intervals for ammonium ion determinations. After the static back-exchange, the zeolite is removed from the solution, washed with water, dried at 110° C., air-equilibrated, and analyzed for ammonium.

Tables IV, V, and VI present the results.

TABLE IV $NH_4$ Uptake by Clinoptilolites A and B, and Potassium Zeolite F from Solution Containing 85 meq NaCl, 50 meq KCl and 5 meq $CaCl_2$ Per Liter

| Weights: | Clinoptilolite A | 7.65 g | powder equilibrated for 1 hour with 500 ml solution |
|---|---|---|---|
| | Clinoptilolite B | 8.73 g | |
| | KF | 10.02 g | |

| | Meq $NH_4$ in Solution | Meq $NH_4$/gm on Zeolite (Calc.) |
|---|---|---|
| Control (no zeolite present) | 5.0 | — |
| Clinoptilolite A | 4.2 | 0.105 |
| Clinoptilolite B | 4.7 | 0.034 |
| KF | 1.2 | 0.379 |
| Control | 15.2 | — |
| Clinoptilolite A | 13.2 | 0.288 |
| Clinoptilolite B | 14.3 | 0.115 |
| KF | 5.4 | 1.059 |
| Control | 24.7 | — |
| Clinoptilolite A | 22.9 | 0.379 |
| Clinoptilolite B | 24.7 | 0.046 |
| KF | 12.5 | 1.728 |
| Control | 35.5 | — |
| Clinoptilolite A | 33.0 | 0.627 |
| Clinoptilolite B | 34.4 | 0.344 |
| KF | 21.3 | 2.605 |
| Control | 40.2 | — |

TABLE IV-continued $NH_4$ Uptake by Clinoptilolites A and B, and Potassium Zeolite F from Solution Containing 85 meq NaCl, 50 meq KCl and 5 meq $CaCl_2$ Per Liter

| Weights: | Clinoptilolite A | 7.65 g | powder equilibrated for 1 hour with 500 ml solution |
|---|---|---|---|
| | Clinoptilolite B | 8.73 g | |
| | KF | 10.02 g | |

| | Meq $NH_4$ in Solution | Meq $NH_4$/gm on Zeolite (Calc.) |
|---|---|---|
| KF | 34.9 | 3.13 |

TABLE V $NH_4$ Uptake By Sodium Zeolite A and Natural Chabazite (1/16" Pellets) from Solution Containing 85 meq NaCl, 50 meq KCl and 5 meq $CaCl_2$ Per Liter (10 g Zeolite Equilibrated 2 Hours With 500 ml Solution)

| | Meq $NH_4$ in Solution | Meq $NH_4$/gm. on Zeolite (Calc.) |
|---|---|---|
| Control Solution (No Zeolite) | 5.1 | — |
| NaA pellets | 4.5 | 0.6 |
| Natural Chabazite pellets | 4.0 | 1.2 |
| Control Solution | 15.7 | — |
| NaA pellets | 13.5 | 2.3 |
| Natural Chabazite pellets | 12.1 | 3.8 |
| Control Solution | 26.7 | — |
| NaA pellets | 22.1 | 5.1 |
| Natural Chabazite pellets | 20.9 | 6.7 |
| Control Solution | 36.9 | — |
| NaA pellets | 31.1 | 7.2 |
| Natural Chabazite pellets | 30.9 | 8.0 |

TABLE VI $NH_4$ Uptake by Potassium Zeolite F, Sodium Zeolite Y, Sodium Zeolite X (1/16" Pellets), Potassium Zeolite X (Powder) and Potassium Zeolite Y from Solution Containing 85 meq NaCl, 50 meq KCl and 5 meq $CaCl_2$ Per Liter

| Weights: | KF | 10.0059 g | powder equilibrated for ½ hour in 500 ml solution and pellets equilibrated for 2 hours in 500 ml solution |
|---|---|---|---|
| | NaY | 10.0036 g | |
| | NaX | 10.0587 g | |
| | KX | 10.0014 g | |
| | KY | 10.0290 g | |

| | Meq $NH_4$ in Solution | Meq $NH_4$/gm. on Zeolite (Calc.) |
|---|---|---|
| Control | 5.1 | — |
| KF | 1.3 | 0.38 |
| NaY | 3.4 | 0.17 |
| NaX pellets | 3.7 | 0.14 |
| KX powder | 3.6 | 0.16 |
| KY | 3.6 | 0.16 |
| Control | 15.2 | — |
| KF | 5.4 | 1.06 |
| NaY | 11.1 | 0.44 |
| NaX pellets | 11.5 | 0.39 |
| KX powder | 12.1 | 0.34 |
| KY | 11.4 | 0.41 |
| Control | 25.2 | — |
| KF | 12.8 | 1.76 |
| NaY | 19.9 | 0.75 |
| NaX pellets | 20.1 | 0.72 |
| KX powder | 20.7 | 0.77 |
| KY | 19.8 | 0.74 |
| Control | 36.1 | — |
| KF | 20.6 | 2.76 |
| NaY | 29.4 | 1.18 |
| NaX pellets | 29.7 | 1.06 |
| KX powder | 29.5 | 1.16 |
| KY | 29.1 | 1.14 |
| Control | 41.6 | — |
| KF | 26.7 | 3.45 |
| NaY | 35.2 | 1.49 |
| NaX pellets | — | — |
| KY | 37.4 | 1.55 |

It will be noted from the above that chabazite, zeolite X, and zeolite Y are superior to such materials as clinoptilolite, but that zeolite F is many times as effective as clinoptilolite, or indeed, any of the other natural or synthetic zeolites.

Summary data are presented in Table VII, below. Again the superiority of zeolite F is manifest.

TABLE VII

Summary of Ammonium Take-Up* and Release Results**

|  | Meq NH4/gm. on zeolite (calc.) | Meq NH4/gm. on zeolite (analyzed) | Meq NH4/gm. removed (analyzed) | Meq NH4/gm. on zeolite after Removal (analyzed) |
|---|---|---|---|---|
| Sodium Zeolite A | 0.70 | — | 0.34 | 0.15 |
| Natural Chabazite | 0.80 | — | 0.41 | 0.33 |
| Clinoptilolite A | 0.63 | 0.49 | 0.32 | 0.12 |
| Clinoptilolite B | 0.34 | 0.24 | 0.21 | 0.08 |
| Potassium Zeolite F | 3.13 | 2.47 | 0.81 | 1.64 |
| Potassium Zeolite F | 3.45 | 2.35 | 0.69 | 1.68 |
| Sodium Zeolite Y | 1.49 | 0.96 | 0.63 | 0.36 |
| Sodium Zeolite X | 1.16 | 0.65 | 0.38 | 0.27 |
| Potassium Zeolite Y | 1.55 | 0.95 | 0.65 | 0.35 |
| Potassium Zeolite X | 1.58 | 0.84 | 0.55 | 0.32 |

*Static exchange using 10 g zeolite and 500 ml solution containing 85 meq Na, 50 meq K, 5 meq Ca per liter and varying NH4.
**Static back-exchange using 10 g zeolite and 500 ml solution containing 140 meq Na, 15 meq K and 5 meq Ca per liter.

The data of Table VII suggests that the molecular sieve type zeolites actually take up ammonia in a considerable amount beyond that which enters the zeolite by cation exchange. Note in particular the approximately 50% larger value for the ammonium ion takeup, or exchange, calculated by its depletion from the treatment liquor versus that found by direct analysis of the zeolite after washing. Apparently the function of a zeolite in accumulating and gradually releasing ammonia, or ammonium ion, is not solely by virtue of a cation exchange mechanism.

SERIES B

In this series of experiments, natural cow rumen fluid, removed from fistulated animals, is used to demonstrate the effectiveness of potassium zeolite F in reducing the ammonium ion content of a ruminal fluid and thereafter gradually releasing the ammonium ion in the presence of additional ruminal fluid.

The experimental procedure is to pre-treat one gram of zeolite with 50 ml of rumen fluid, collected several hours after feeding and found to have a pH of 7.6, for one hour. Designated quantities of an ammonium salt are then added, and the system shaken for two hours and then centrifuged for one hour. The solids are separated, analyzed for ammonia, and then twice regenerated by successive exposures to fresh 50 ml portions of rumen fluid, each for two hours followed by centrifugation.

The results are presented below in Table VIII. The high degree of ammonium ion retention by the zeolite is particularly noted, as is the excellent ultimate recovery of ammonium ion upon regeneration.

SERIES C

This series, again in vitro, further demonstrates the effectiveness of potassium zeolite F in removing ammonium ion in a simulated urea digestion process, and in releasing the ion during regeneration with an ammonia-free regenerant.

The solutions for this series are natural cow ruminal fluids, connected immediately before feeding and somewhat after feeding.

One gram of potassium zeolite F powder is placed in rumen fluid taken from a cow prior to feeding (pH 6.67) along with predetermined amounts of ammonia chloride solution (concentration equals 1 meq NH4/ml), namely 0 ml, 1.0 ml, 2.5 ml, and 5.0 ml, and the volume brought to 50 ml in each case. The amounts of NH4 added to the system are thus 0, 1, 2.5, and 5.0 meq/50 ml.

By analysis, the amount of ammonium ion initially present in the rumen fluid from the cow before feeding is 0.249 meq NH4/50 ml (Treat No. 1, Extraction I). The amount initially present in rumen fluid is subtracted from the NH4 in solution after reaching equilibrium with the zeolite. Thus, in Treat No. 2 of Extraction I, the absolute concentration of NH4 in solution is 0.6533 meq/50 ml; when the initial content of 0.2491 meq NH4 is subtracted, this gives 0.4042 meq NH4 per 50 ml solution. Since 1.0 meq of ammonium ion is added, substraction of 0.4042 meq NH4 from 1.0 gives 0.5958 meq NH4 taken up by the one gram of zeolite. Similar calculations are made for the remainder of the treatments in Extraction I.

In order to simulate removal of exchanged or adsorbed NH4 from the zeolite by the cow's generation of saliva and subsequent addition of the saliva to the ruminal fluid, one-half (25 ml) of the liquid phase is withdrawn and replaced by 25 ml of rumen fluid taken from a cow after feeding (pH 6.75); the system is allowed to

TABLE VIII

| | | Potassium Zeolite F Treated With Rumen Fluid | | | | | | |
|---|---|---|---|---|---|---|---|---|
| | NH4 | NH4 | | NH4 Recovered from Zeolite | | | | |
| | added | on zeolite | | First regeneration | | Second regeneration | | Total % |
| Run No. | meq/g | meq/g | % | meq/g | % | meq/g | % | Recovered |
| 1 | 0 | 0.00 | 0.00 | 0.00 | 0.00 | 0.00 | 0.00 | 0.00 |
| 2 | 1 | 0.7814 | 78.1 | 0.1552 | 19.9 | 0.1222 | 15.6 | 35.5 |
| 3 | 2.5 | 1.4942 | 58.7 | 0.4042 | 27.1 | 0.2632 | 17.6 | 44.7 |
| 4 | 5.0 | 2.4808 | 49.6 | 0.8368 | 33.7 | 0.4465 | 18.0 | 51.7 | come to equilibrium. The amount of ammonium ion released is then calculated as above. The amount of $NH_4$ in the rumen fluid added in Extraction II, Treatment No. 1, is 0.3995 meq $NH_4$/50 ml; the amount of $NH_4$ in the system after removal of 25 ml is equal to that taken up by the zeolite (Extraction I, Treatment No. 1, 0.5958 meq $NH_4$, plus one-half that in solution ($\frac{1}{2} \times 0.4042$ meq $NH_4$/50 ml=0.2021 meq $NH_4$) for a total of 0.7979 meq $NH_4$/50 ml. The total amount of $NH_4$ in solution in Extraction II, Treatment No. 2, when corrected for the amount of $NH_4$ added in the 25 ml of rumen fluid, is 0.3007 meq $NH_4$/50 ml. Subtraction of this amount from the 0.7979 meq $NH_4$ in the system gives a value of 0.4972 meq $NH_4$ for the amount taken up by the zeolite. When the amount of ammonium ion taken up by the zeolite in Extraction I for the various treatments is related to the amounts of ammonium ion remaining after Extraction VII, it is evident that the percentages of ammonium ion removed from the respective solutions containing 1.0, 2.5, and 5.0 meq $NH_4$ treatments are 50.7%, 56.9%, and 55.7%, respectively.

The data are presented in Table IX below. This series indicates that zeolite F is capable of releasing about one-half of the initially adsorbed ammonium ion when extracted batchwise with actual ruminal fluid.

TABLE IX

| | | Potassium Zeolite F Treated With Before-Feeding And After-Feeding Cow Rumen Fluid | | | | | |
|---|---|---|---|---|---|---|---|
| Extraction | Treatment | $NH_4$ Added meq/50 ml | $NH_4$ in Solution meq/50 ml | $NH_4$ on Zeolite | | $NH_4$ Recovered | |
| | | | | meq/g | % of Added | meq/50 ml | % |
| I. | 1 | 9 | 0.2491 | — | — | — | — |
| | 2 | 1 | 0.4042 | 0.5958 | 59.6 | — | — |
| | 3 | 2.5 | 1.0434 | 1.4566 | 58.3 | — | — |
| | 4 | 5 | 2.4675 | 2.5325 | 50.7 | — | — |
| II. | 1 | 0 | 0.3995 | — | — | — | — |
| | 2 | 0.7979 | 0.3007 | 0.4972 | 49.7 | 0.09860 | 16.5 |
| | 3 | 1.9783 | 0.7943 | 1.1840 | 47.4 | 0.27260 | 18.7 |
| | 4 | 3.76625 | 1.7813 | 1.98495 | 39.7 | 0.54755 | 21.6 |
| III. | 1 | 0 | 0.5311 | — | — | — | — |
| | 2 | 0.64755 | 0.2350 | 0.41255 | 41.3 | 0.08465 | 17.0 |
| | 3 | 1.58115 | 0.5969 | 0.98425 | 39.4 | 0.19975 | 16.9 |
| | 4 | 2.8756 | 1.1750 | 1.7006 | 34.0 | 0.28435 | 14.3 |
| IV. | 1 | 0 | 0.6204 | — | — | — | — |
| | 2 | 0.58005 | 0.1927 | 0.38735 | 38.7 | 0.0252 | 6.1 |
| | 3 | 1.2827 | 0.4418 | 0.8409 | 33.6 | 0.14335 | 14.6 |
| | 4 | 2.2881 | 0.7990 | 1.4891 | 29.8 | 0.2115 | 12.4 |
| V. | 1 | 0 | 0.6627 | — | — | — | — |
| | 2 | 0.4837 | 0.1457 | 0.3380 | 33.8 | 0.04935 | 12.7 |
| | 3 | 1.0618 | 0.3431 | 0.7187 | 28.8 | 0.1222 | 14.5 |
| | 4 | 1.8886 | 0.5687 | 1.3199 | 26.4 | 0.1692 | 11.4 |
| VI. | 1 | 0 | 0.7520 | — | — | — | — |
| | 2 | 0.41085 | 0.1034 | 0.30745 | 30.8 | 0.03055 | 9.0 |
| | 3 | 0.89025 | 0.2444 | 0.64585 | 25.8 | 0.07285 | 10.1 |
| | 4 | 1.60425 | 0.4559 | 1.14835 | 23.0 | 0.17155 | 13.0 |
| VII. | 1 | 0 | 0.8460 | — | — | — | — |
| | 2 | 0.35915 | 0.0658 | 0.29335 | 29.3 | 0.01410 | 4.6 |
| | 3 | 0.76805 | 0.1410 | 0.62705 | 25.1 | 0.01880 | 2.9 |
| | 4 | 1.4263 | 0.3055 | 1.1208 | 22.4 | 0.02755 | 2.4 |

The results are summarized in FIG. 1.

SERIES D

This series, conducted in vivo, demonstrates the adsorption of ammonium ion by sodium zeolite X after feeding urea to a sheep.

Four bags, each containing 25 grams of 1/16" pellets of sodium zeolite X (including approximately 25% of inert binder) are placed in the rumen of a sheep at 4:00 p.m. The first bag is removed at 9:15 a.m. the following day, the rumen is sampled for chemical analysis, and the sheep then fed 1.5 pounds of hay. After fifteen minutes another rumen sample is taken, and five grams urea in 20 ml water is introduced to the rumen. After forty-five minutes the second bag of zeolite is removed, and the third at ninety minutes. The fourth bag is left overnight and removed after twenty-four hours (following day at 9:15 a.m.).

Figure 2:
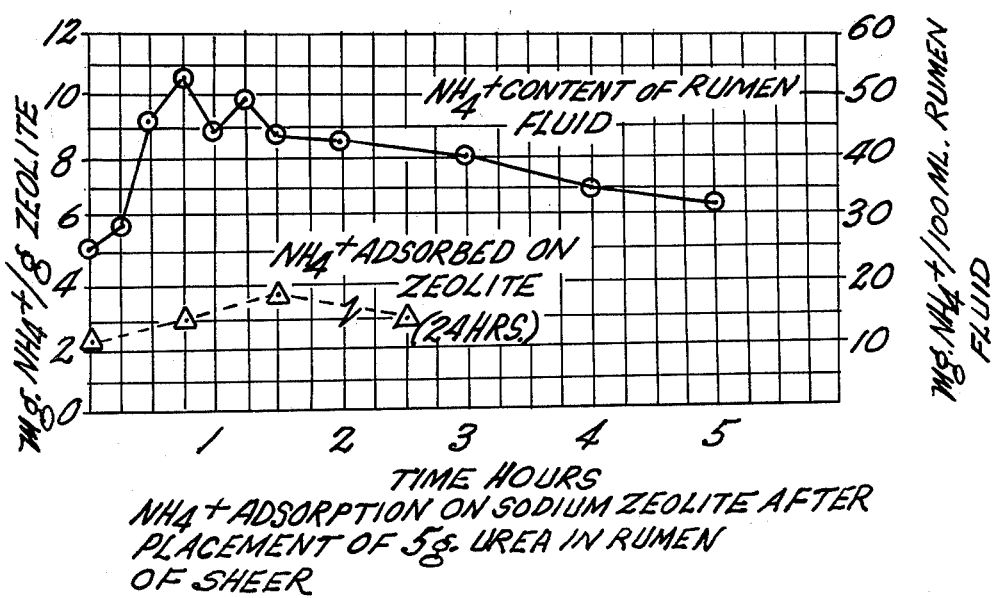
FIG. 2 depicts the effect of sodium zeolite X in mitigating the ammonium ion content in the rumen of a sheep.

The exchangeable ammonium ion content of the zeolite and of the rumen fluid are plotted in FIG. 2. Considering the total weight of zeolite, and estimating the rumen volume as 10 liters, the amount of ammonium ion adsorbed by the zeolite is approximately 10–15% of that present in the rumen.

SERIES E

In this series, the rate of ammonium ion release from ammonium-saturated zeolite X and zeolite F (1/16" pellets), when placed in the rumen of sheep and cattle, is studied.

Sheep "A" is fed hay only, at a rate of three pounds per day. Sheep "B", "C", and "D" are fed Purdue 58 lamb pellets (free choice) plus 100 grams per day of hay. The steer is fed a mixture of corn silage and grain.

The zeolites, in the form of 1/16" pellets, are pretreated to saturation with an ammonium chloride solution. The amount of ammonium ion on the zeolite is: 22.187 mg $NH_4$/g on the zeolite X, and 18.567 mg $NH_4$/g on the zeolite F.

Bags of the zeolite are inserted into the animal rumens at 4:00 p.m. and removed the next morning shortly after the rumen fluid is sampled.

The results are given in Table X below.

TABLE X

| Release of $NH_4^+$ from Zeolite X and F in Animal Rumen | | | |
|---|---|---|---|
| Animal | Zeolite | $NH_4^+$ remaining on zeolite, % | $NH_4^+$ released from zeolite, % |
| SHEEP | | | |
| A | X | 15.5 | 84.5 |

TABLE X-continued

Release of $NH_4^+$ from Zeolite X and F in Animal Rumen

| Animal | Zeolite | $NH_4^+$ remaining on zeolite, % | $NH_4^+$ released from zeolite, % |
|---|---|---|---|
|  | F | 62.4 | 36.6 |
| B | X | 25.8 | 74.2 |
|  | X | 35.8 | 64.2 |
| C | F | 57.7 | 42.3 |
| D | F | 62.8 | 37.2 |
| STEER | X | 10.7 | 89.3 |
|  | F | 31.7 | 68.3 |

SERIES F

To compare the effect of zeolite administration on NPN consumption by sheep, a fistulated animal was selected. Its ruminal capacity was estimated as 6 liters; decompositon of 15 g of urea would produce a theoretical ammonium ion concentration of 118 mg/100 ml.

The animal was first fed 15 g urea, and samples of the ruminal fluid were withdrawn periodically and analyzed for ammonium ion level. The results are shown in Table XI below.

Ten weeks later, two nylon mesh bags containing the desired zeolite (85 g of NaX in one, 87 g of NaF in the other) were placed in the rumen. Again 15 g of urea was fed to the animal, and again periodic samples were withdrawn and analyzed. The results are shown in Table XI below.

TABLE XI

| Minutes After Ingestion of Urea | Ammonium Level in Rumen Fluid; mg./100 ml. | |
|---|---|---|
|  | No Zeolite | 85 g. zeolite |
| 0 | 22 | 1.3 |
| 15 | 31 | — |
| 20 | — | 25.4 |
| 30 | 40 | — |
| 40 | — | 34.1 |
| 45 | 52 | — |
| 60 | 56 | 36.2 |
| 75 | 53 | — |
| 80 | — | 34.0 |
| 100 | — | 16.6 |
| 120 | 55 | — |
| 140 | — | 16.4 |
| 180 | — | 17.4 |
| 210 | 39 | — |
| 345 | 29 | — |
| 420 | 27 | — |

While the data are limted to one animal and fresh zeolite, a reduction in the ammonium ion level of 15–20 mg./100 ml. at these stages of the digestion is apparent. Most important, of course, is the fact that the peak ammonium ion level was similarly reduced—from about 56 mg./100 ml. without zeolite, to about 36 with.

One attempt to use zeolite X to moderate the ammonium ion content of a urea-fed steer gave inconclusive results, presumably because of fluctuations in the volume of rumen fluid.

It has been suggested (in part by others) that the zeolite in the rumen be in the form of a zeolite powder entrapped in a porous matrix composed of an extruded filament of cellulose acetate, which may or may not have a core of pre-formed plastic which would cause the filament to assume a predetermined configuration so as to be more uniformly positioned in the rumen, e.g., as an expanded spiral or similar shape which would occupy most of the rumen volume. Numerous filaments may be attached to a heavy "anchor" so that the filaments float seaweed-like in the rumen. Thus, the shape allows an appropriate weight of zeolite to be introduced through a tube as a continuous thread; each end of the filament is protected by a small round plastic sphere. Thus, the zeolite powder, entrapped in a highly porous cellulose acetate sheath, provides both a high surface area and a short diffusion path, both being optimal configurations of a bolus from the standpoint of high mass transfer rates.

Thus it is apparent that there has been provided, according to the invention, a system which significantly improves the feeding of non-protein nitrogen compounds to ruminants. By providing a cation exchange zeolite in the rumen prior to decomposition of the compound, the resulting ammonium ion content is mitigated by adsorption or exchange onto the zeolite and, during rumination, the zeolite is regenerated, and ammonium ions grandually released, by the regenerant action of saliva entering the rumen.

While the invention has been described in conjunction with specific embodiments, it is manifest that many alternatives, modifications and variations will be apparent to those skilled in the art in light of the foregoing description.

Accordingly, it is intended to embrace all such alternatives, modificaions, and variations as fall within the spirit and broad scope of the appended claims.

The following is claimed as invention:

1. A method for feeding ruminants urea or biuret as a non-protein nitroen (NPN) compound and for mitigating the toxic effects of high ammonium ion content in ruminal fluid produced by decomposition of said NPN compound to ammonia in the rumen during post-feeding fermentation and conversion to protein amino acids, which comprises:
   (a) introducing into the rumen at least one foraminous bolus containing a crystalline alumino silicate cation exchange material in an amount sufficient to substantially reduce the ammonium ion content of the ruminal fluid during said post-feeding fermentation and decomposition of said NPN compound, said bolus being of sufficient size, weight, and/or shape to remain in the rumen,
   (b) maintaining said bolus in the rumen during a large number of digestive cycles, and
   (c) feeding said ruminant urea or biuret, the resulting ammonium ions formed in the post-feeding fermentaion and decomposition of said NPN compound being partially exchanged onto the cation exchange material to substantially reduce the ammonium ion content of the ruminal fluid, and thereafter being gradually released into the ruminal fluid by the regenerant action of saliva entering the rumen during rumination.

2. Method of claim 1 wherein said NPN compound is urea.

3. Method of claim 1 wherein said NPN compound is biuret.

4. Method of claim 1 wherein said ruminants are cattle.

5. Method of claim 4 wherein said cattle are feedlot steers.

6. Method of claim 4 wherein said cattle are lactating cows.

7. Method of claim 1 wherein said ruminants are sheep.

8. Method of claim 1 wherein said ruminants are goats.

9. Method of claim 1 wherein said cation exchange material is a natural crystalline alumino silicate.

10. Method of claim 9 wherein said material is chabazite.

11. Method of claim 9 wherein said material is clinoptilolite.

12. Method of claim 1 wherein said material is a synthetic crystalline alumino silicate.

13. Method of claim 12 wherein said material has the structure of zeolite X.

14. Method of claim 12 wherein said material has the structure of zeolite Y.

15. Method of claim 12 wherein said material has the structure of zeolite F.

16. Method of claim 12 wherein said material has the structure of zeolite J.

17. Method of claim 12 wherein said material has the structure of zeolite M.

18. Method of claim 12 wherein said material has the structure of zeolite Z.

19. Method of claim 1 wherein polyolefin pellets are introduced into the rumen as artificial roughage to stimulate saliva production.

* * * * *

UNITED STATES PATENT AND TRADEMARK OFFICE
CERTIFICATE OF CORRECTION

PATENT NO. : 4,393,082
DATED : July 12, 1983
INVENTOR(S) : Joe L. White; Alvin J. Ohlrogge It is certified that error appears in the above-identified patent and that said Letters Patent is hereby corrected as shown below:

Column 1, line 19, delete the word "for" and insert -- from --.

Column 7, line 5, delete the word "respwective" and insert -- respective --.

Column 13, Table IX, Extraction I, in the column "$NH_4$ Added Meq/50 ml", in the Treatment I, delete "9" and insert -- 0 --.

Signed and Sealed this

Eighth Day of November 1983

[SEAL]

Attest:

GERALD J. MOSSINGHOFF

Attesting Officer

Commissioner of Patents and Trademarks